July 3, 1951  G. T. HARCOURT  2,559,248
RIVETING MACHINE FOR CAR ROOF CONSTRUCTION
Filed Aug. 19, 1947  12 Sheets-Sheet 1
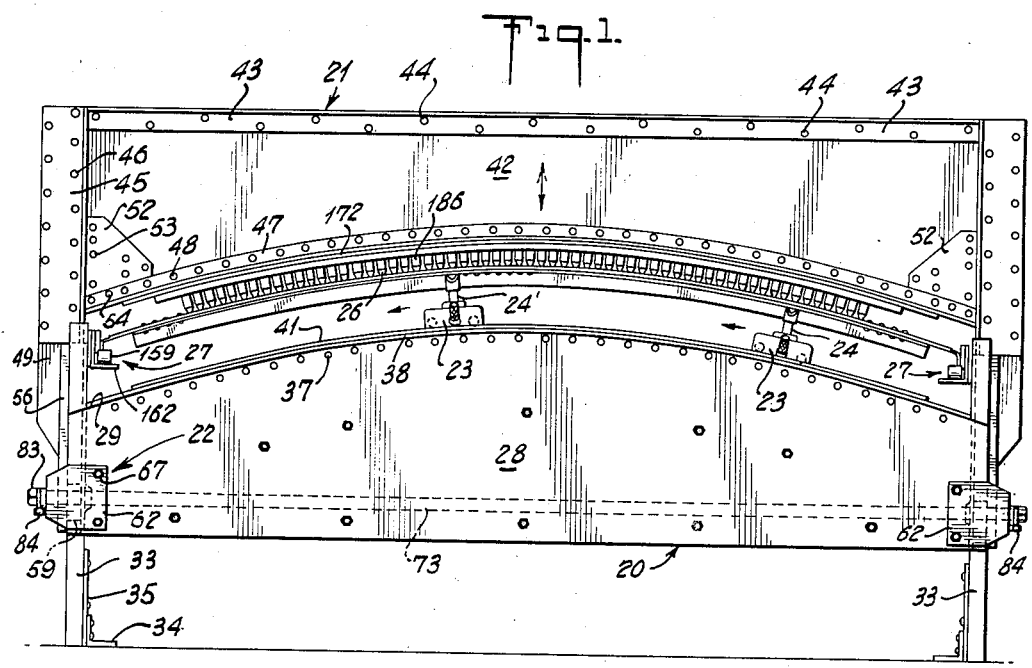
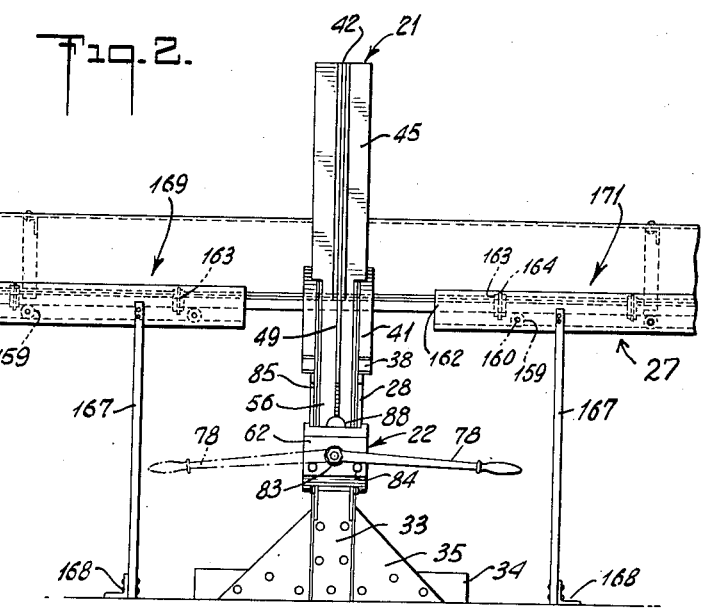
INVENTOR
GEORGE T. HARCOURT.
BY
Raymond G. Mullee
ATTORNEY

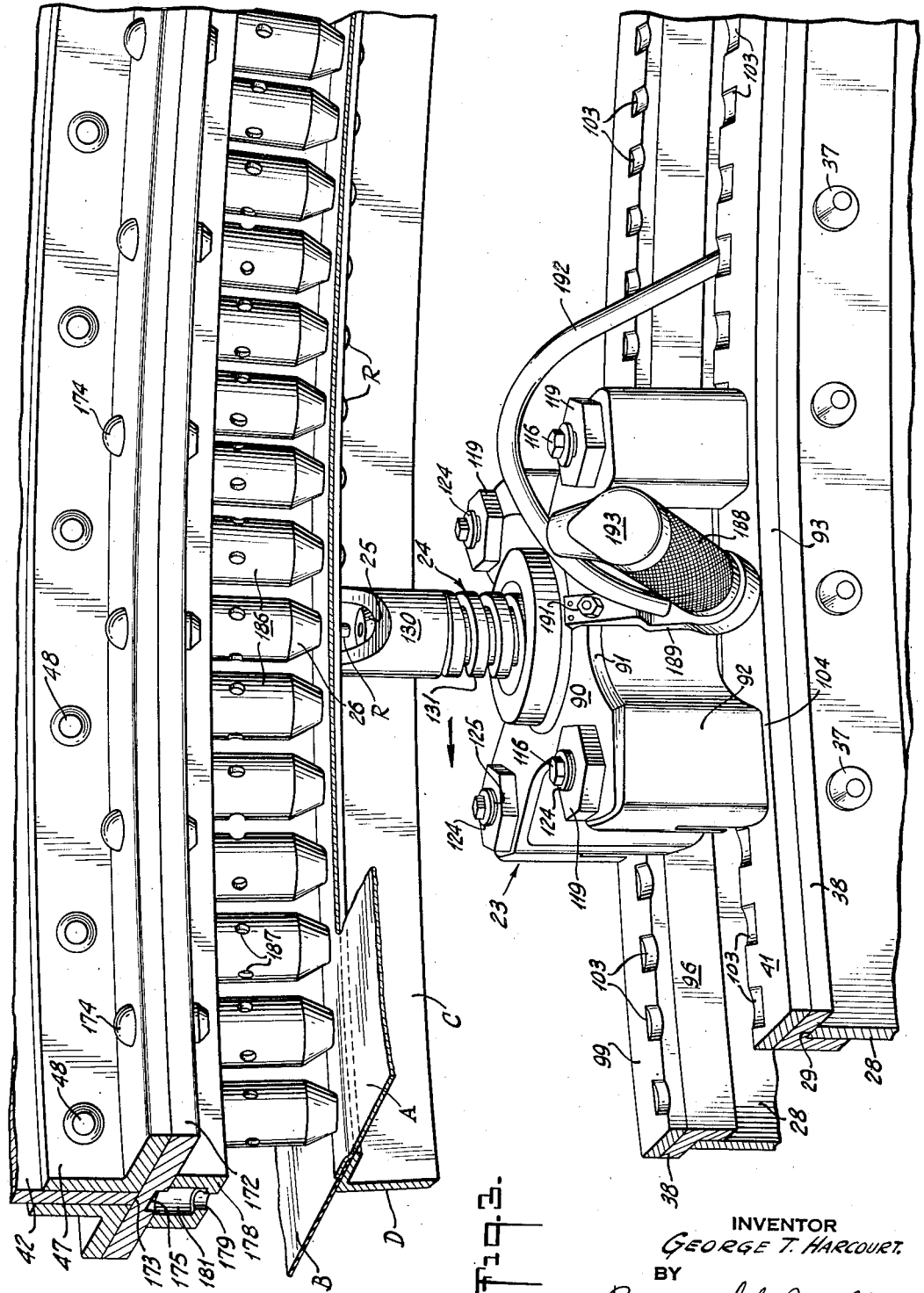

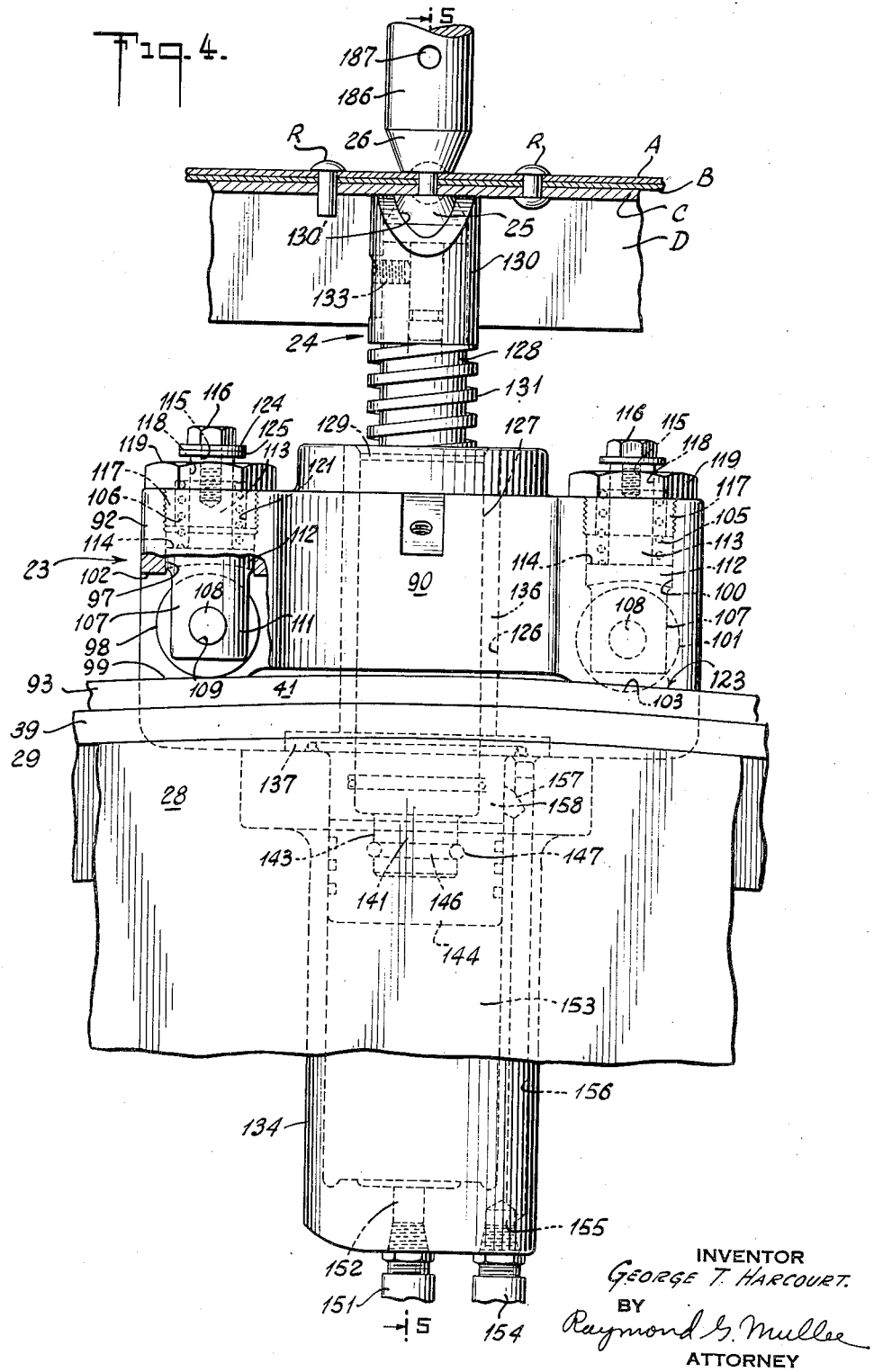

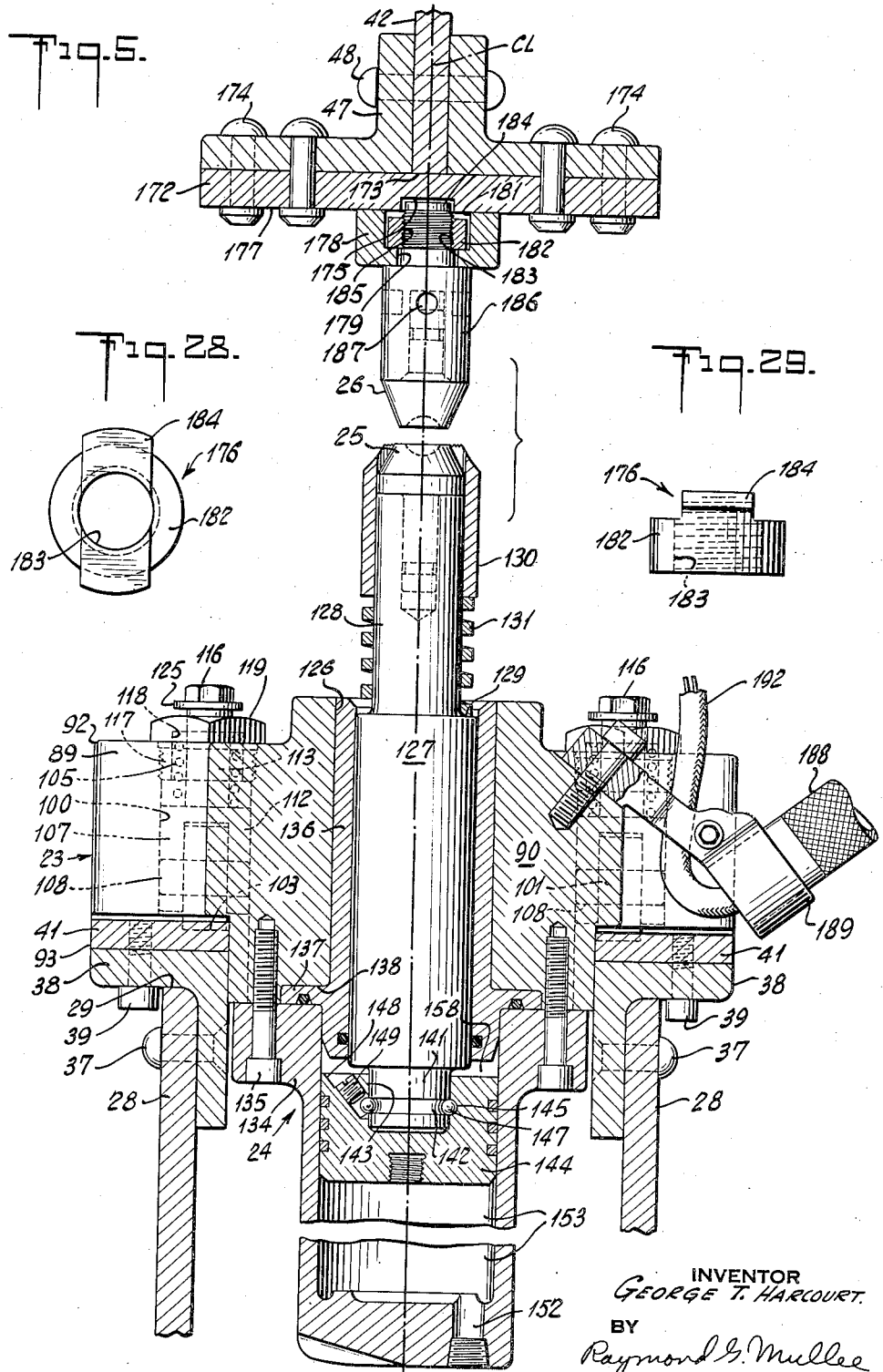

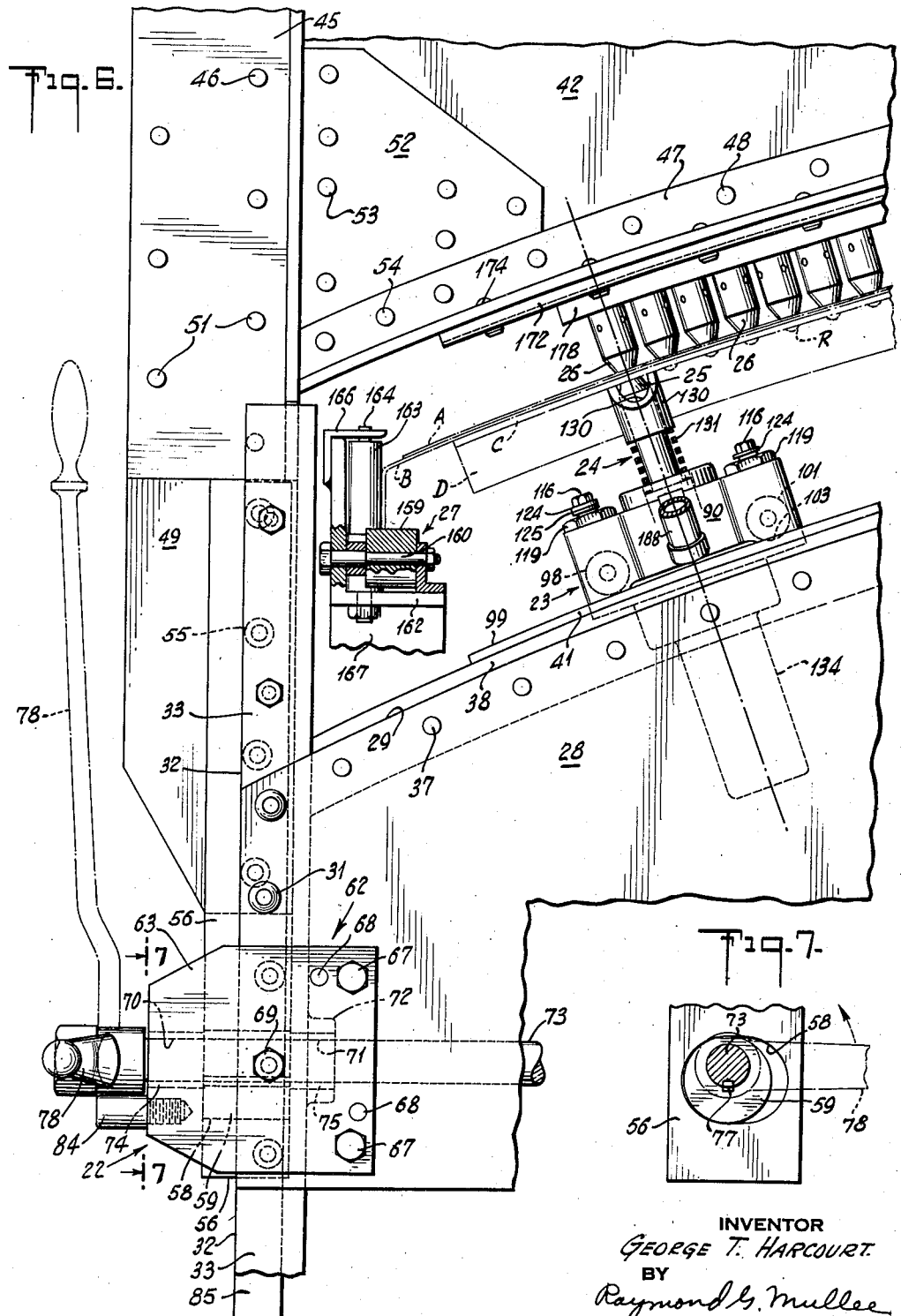

July 3, 1951
G. T. HARCOURT
2,559,248
RIVETING MACHINE FOR CAR ROOF CONSTRUCTION
Filed Aug. 19, 1947
12 Sheets-Sheet 6
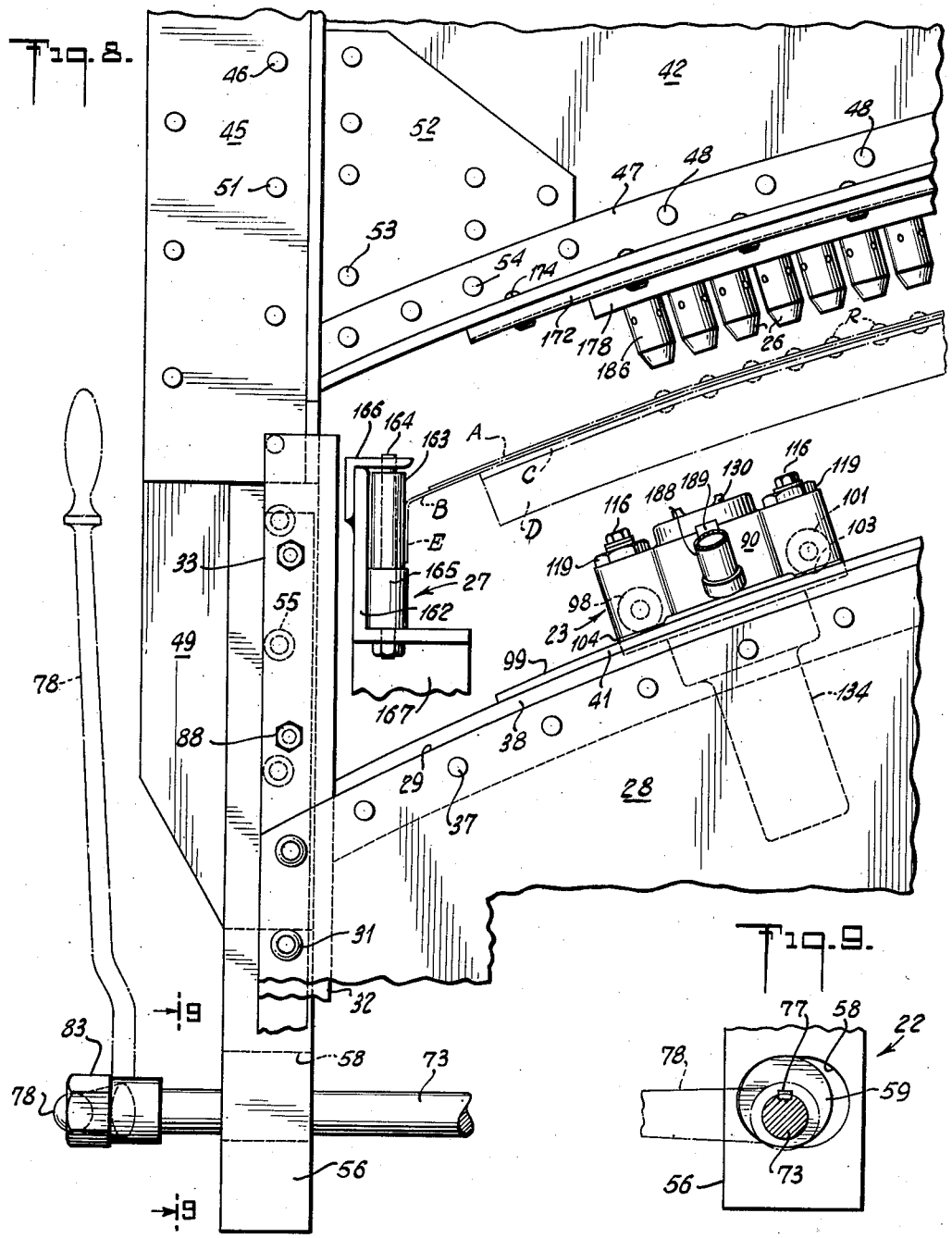
INVENTOR
GEORGE T. HARCOURT.
BY
Raymond G. Mullee
ATTORNEY

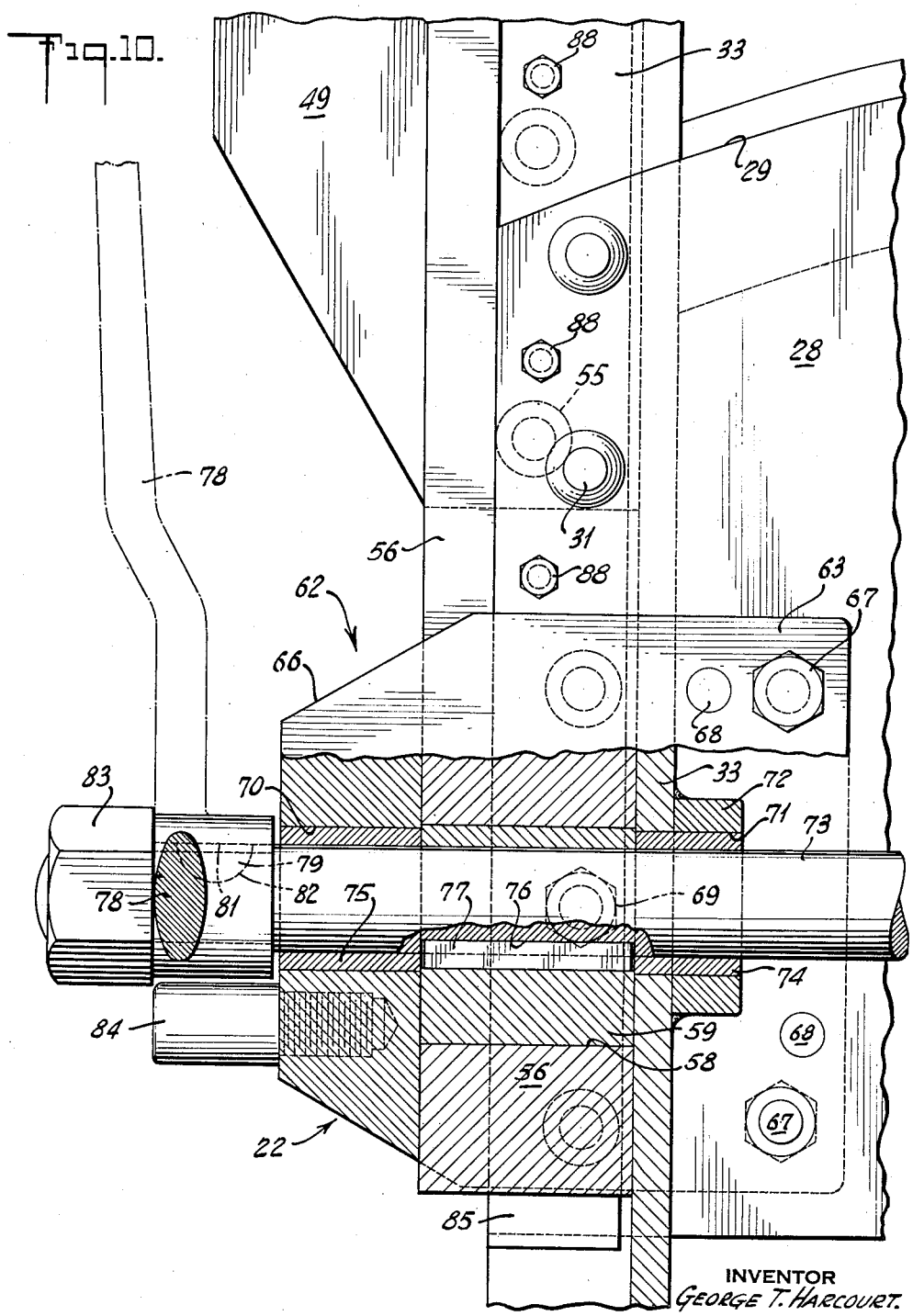

July 3, 1951  G. T. HARCOURT  2,559,248
RIVETING MACHINE FOR CAR ROOF CONSTRUCTION
Filed Aug. 19, 1947  12 Sheets-Sheet 8
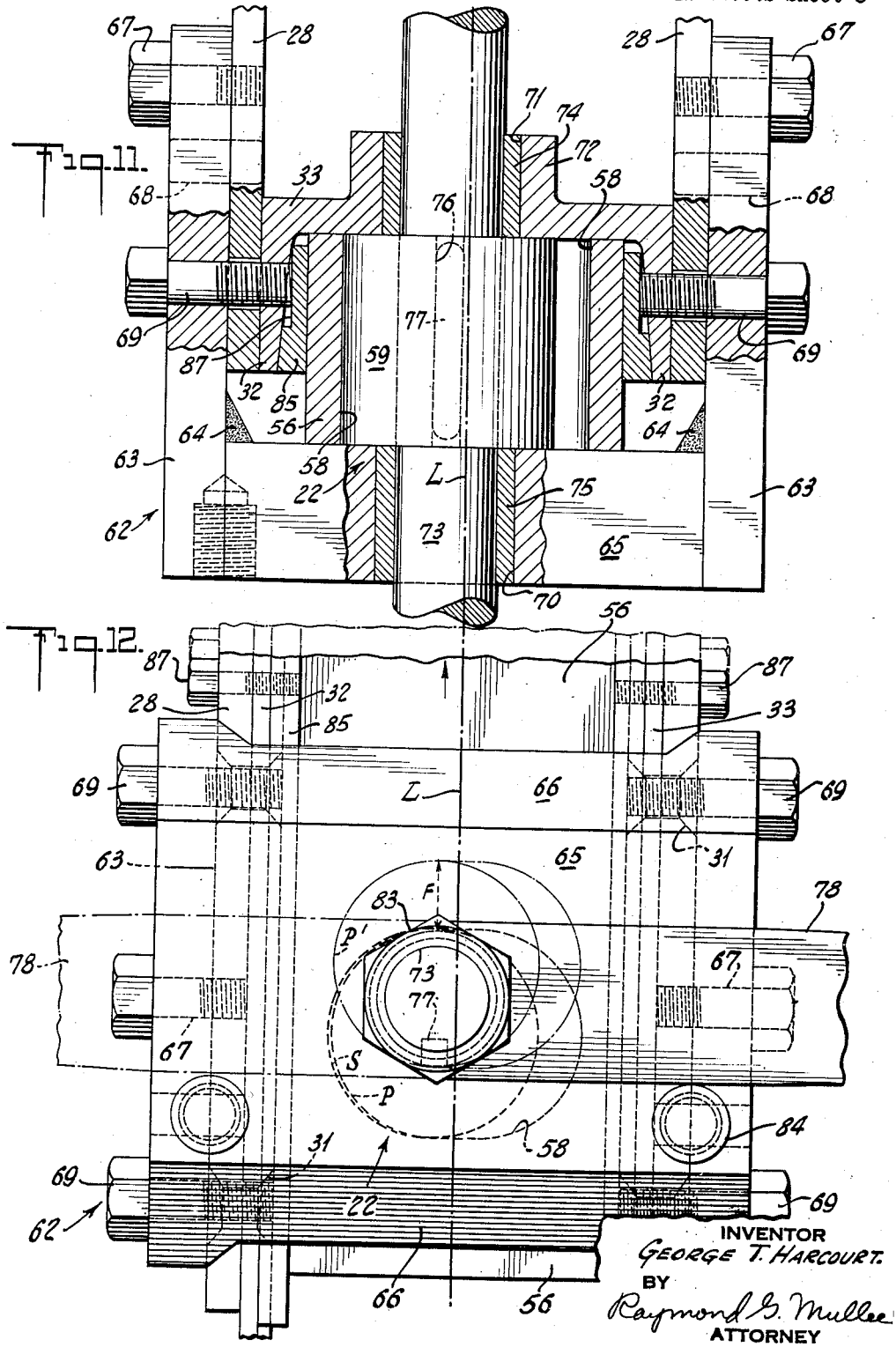

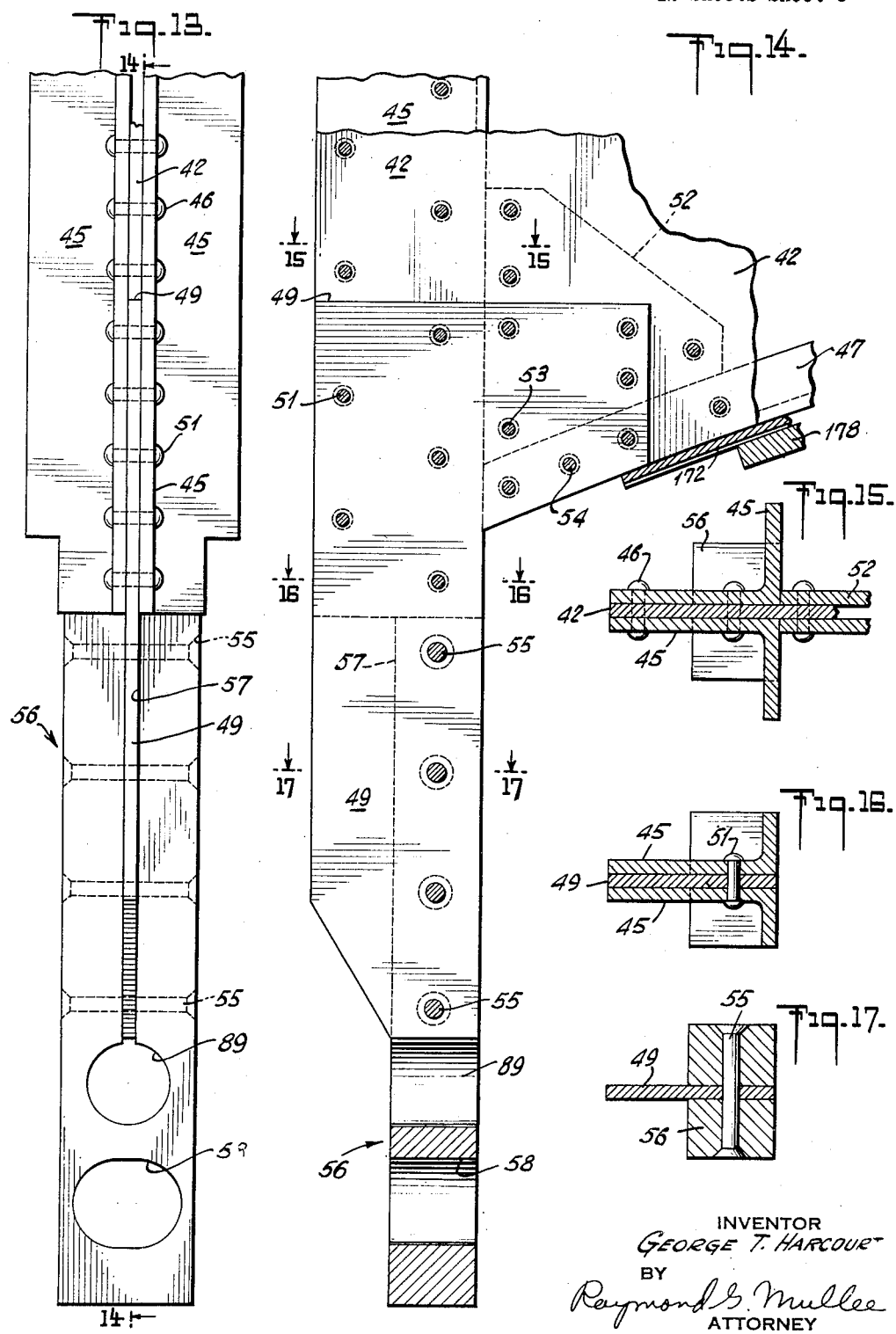

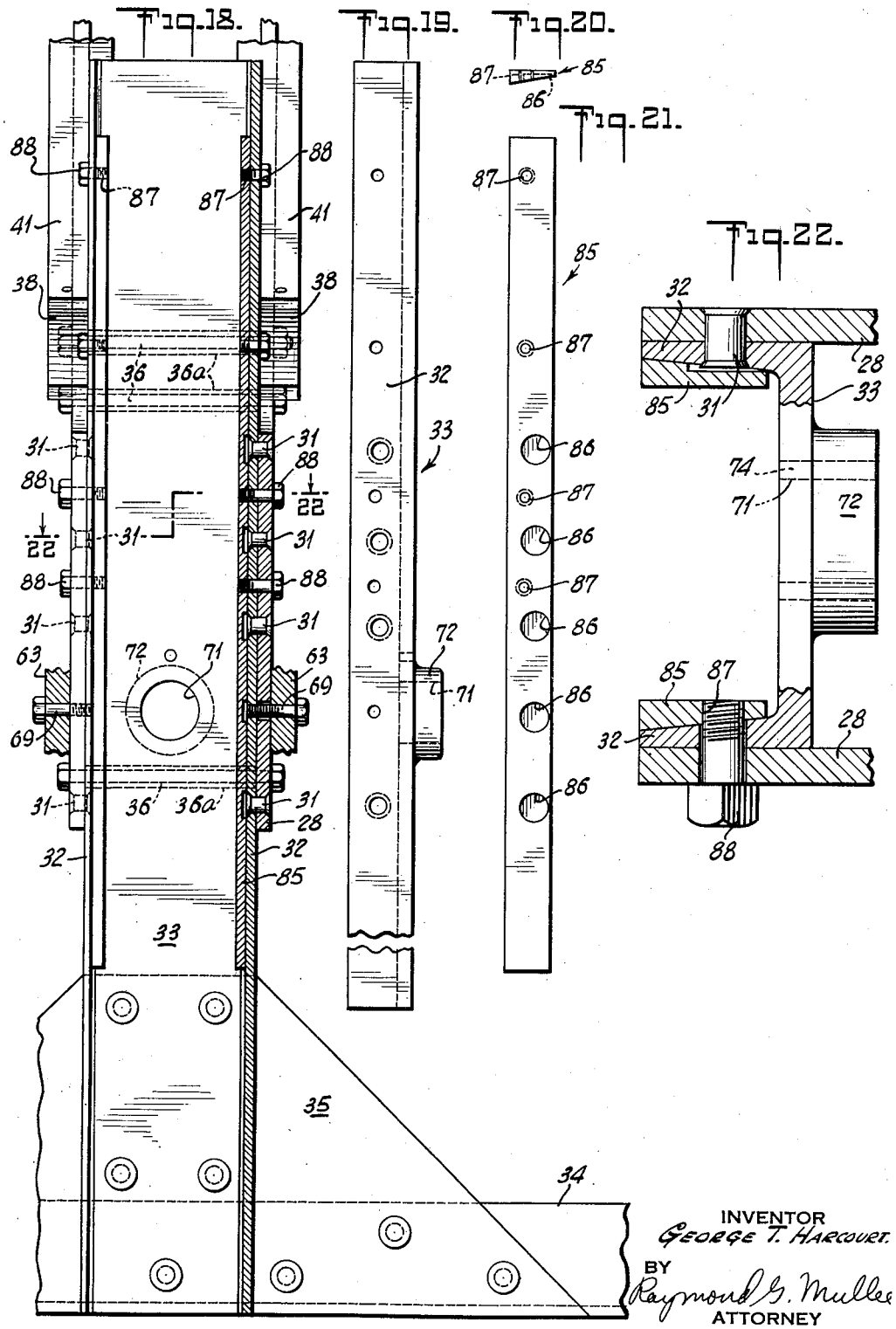

July 3, 1951  G. T. HARCOURT  2,559,248
RIVETING MACHINE FOR CAR ROOF CONSTRUCTION
Filed Aug. 19, 1947  12 Sheets-Sheet 11
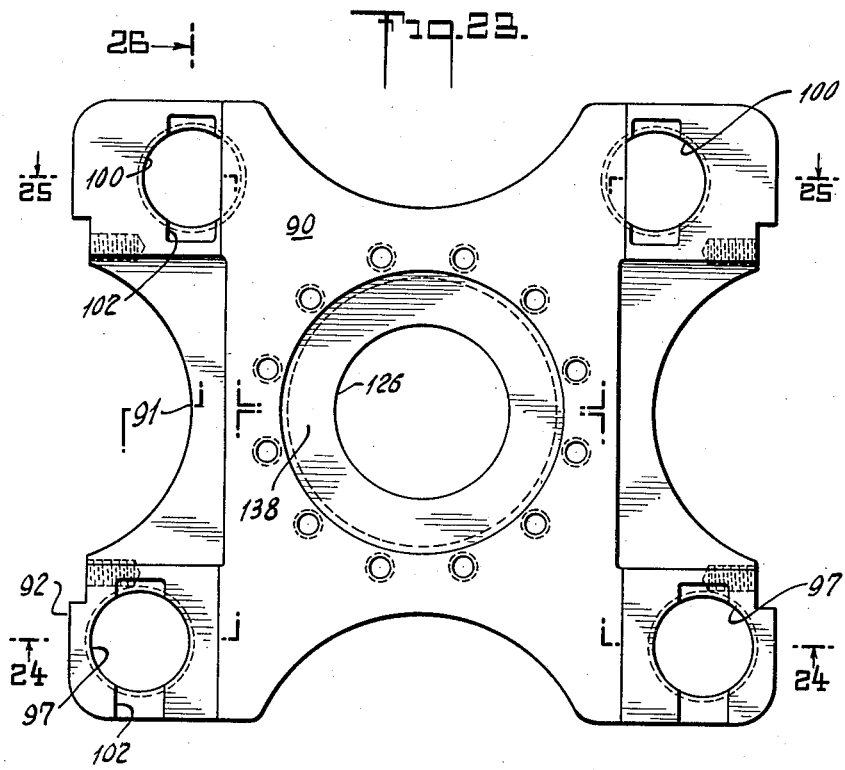
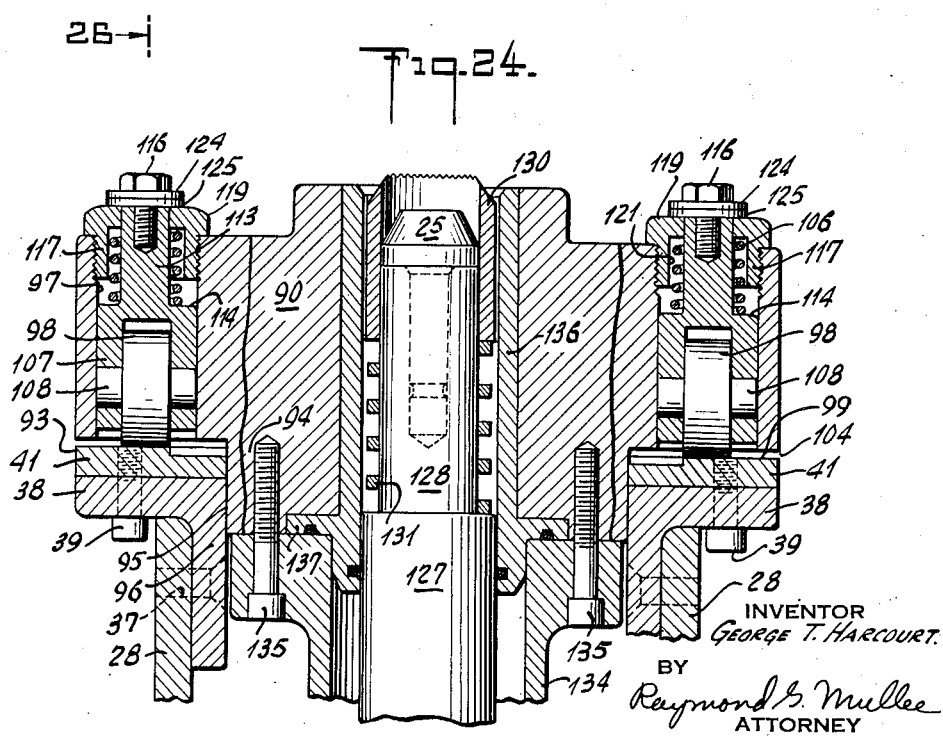
INVENTOR
GEORGE T. HARCOURT.
BY Raymond G. Mullee
ATTORNEY July 3, 1951          G. T. HARCOURT          2,559,248
RIVETING MACHINE FOR CAR ROOF CONSTRUCTION
Filed Aug. 19, 1947          12 Sheets-Sheet 12
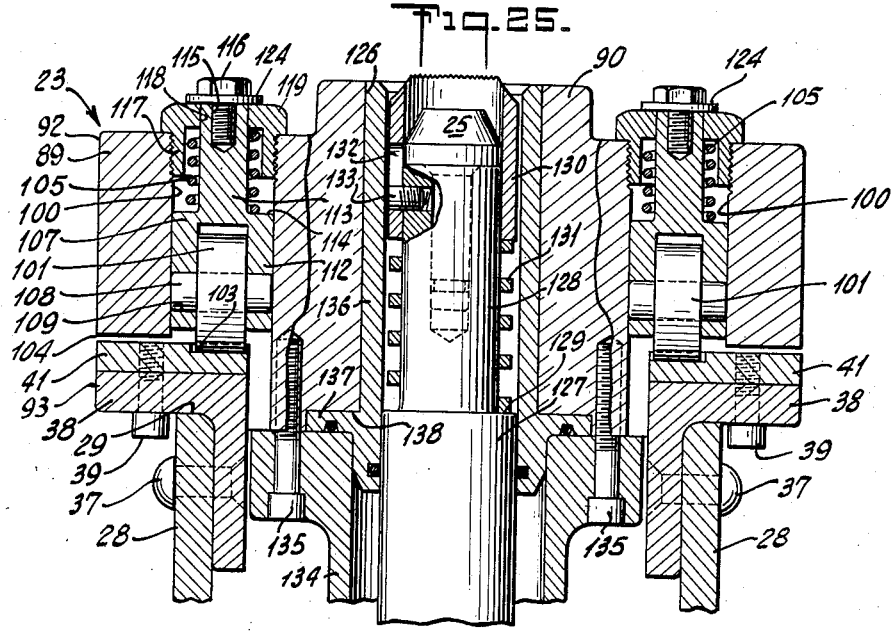
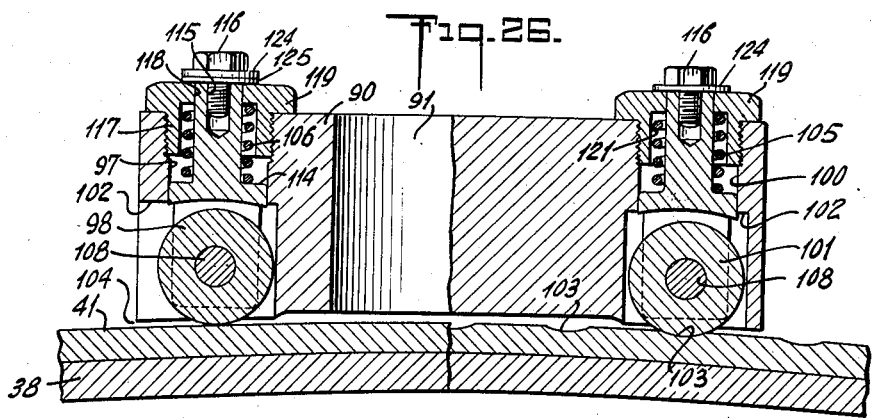
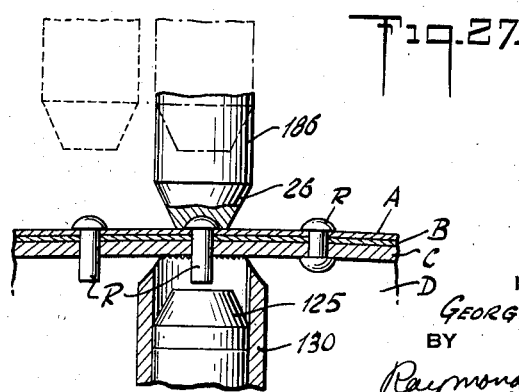
INVENTOR
GEORGE T. HARCOURT.
BY
Raymond G. Mullee
ATTORNEY Patented July 3, 1951

2,559,248

UNITED STATES PATENT OFFICE 2,559,248

RIVETING MACHINE FOR CAR ROOF CONSTRUCTION

George T. Harcourt, Detroit, Mich., assignor to Chicago Pneumatic Tool Company, New York, N. Y., a corporation of New Jersey Application August 19, 1947, Serial No. 769,508

5 Claims. (Cl. 78—48)

This invention relates to a machine for assembling and riveting metal sheets together and is especially designed for fabricating curved roofs for railway freight and passenger cars.

The car roof fabricated in the machine of the illustrative embodiment has dimensions of thirty-one feet by nine feet and comprises a riveted assembly of a plurality of steel sheets having dimensions of nine feet by three and one-half feet, all such dimensions being approximate. A pair of component sheets are positioned on a conveyor and overlapped along their greater length. An angle iron or carling is then positioned on the underside of the seam thus formed, and the three pieces are temporarily assembled by bolts and advanced on the conveyor to the riveting machine to be riveted as hereinafter described. The third sheet is thereafter overlapped upon the second sheet along its greater length, a second carling is positioned on the underside of the second seam, and the riveting operation repeated. Succeeding component sheets and carlings are similarly assembled and riveted to form a complete unit.

An object of this invention is to provide a means and a method of quickly assembling and riveting a series of metal sheets in overlapping relation with each other and with a reinforcing member such as a carling; thereby to fabricate a unit of extensive expanse such as a railway car roof, a ship bulkhead, or airplane wing or fuselage.

Another object is to arrange a hydraulically operated rivet set in movable relation to a series of complementary dollies so as to enable the upsetting of an entire row of rivets upon movement of the set from dolly to dolly and without moving the work sheets.

A feature of the invention is a pressure pad surrounding the rivet set and cooperating with the dollies to clamp the roof sections and carling together before the rivet set makes contact with the rivet to drive the latter. The pressure pad is arranged to be moved out of the way between riveting operations to permit the rivet set or the work to be shifted to a new position.

A further object is to provide such a machine in which a stationary carriage assembly, across which a shuttle or carrier for a rivet set is movable, and a movable carriage assembly which supports a row of dollies are provided with corresponding curved portions so that the dollies are arranged in curved formation and the rivet set is movable by means of the carrier along the curved portion of the stationary carriage assembly and into successive positions in axial alignment with the dollies.

Still a further object is to provide such a machine in which a movable carriage assembly which supports the dollies may be reciprocated by a cam toward and away from the stationary carriage assembly which supports the rivet set to allow clearance for the endwise advancing of a work unit upon completion of a row of rivets. In accordance with this object an entire row of rivets is bucked simultaneously but each rivet is headed individually.

Another object of the invention is to provide an arrangement of a plurality of stationary dollies aligned in the same vertical plane on a carriage so that a hydraulically operated rivet set may be brought by a carrier into axial alignment with each dolly by the movement of a supporting carrier along curved tracks mounted on another carriage whose curvature conforms to that of the dolly carriage. In accordance with a feature of this invention the lower faces of the dollies, when in operative position, are arranged in the arc of a circle concentric with the arc of the curved tracks. The axes of the dollies, as well as the axis of the rivet set, radiate from the common center.

Another object of the invention is to provide a machine having a carriage with a plurality of dollies thereon and a rivet set carrier adapted to advance on a path across a supporting carriage to bring the set successively opposite the dollies, the path being provided with means of automatically locating the carrier in stationary operated positions so that the operator will not be required to see that the rivet set and dolly are in alignment before initiating each riveting operation.

Still another object is to provide a method of temporarily assembling upon a conveyor a plurality of work pieces having preformed rivet holes therein, of inserting rivets into the assembly, of advancing the assembly on the conveyor into riveting position wherein a rivet set may be moved, as desired, along a stationary carriage to bring it seriatim into alignment for a riveting operation with a plurality of dollies arranged upon a second carriage, of riveting the assembly together by successive operations of the rivet set as moved opposite the dollies, of elevating the dolly carriage to provide for clearance of the completed assembly, of again advancing the assembly to bring forward the succeeding assembly of work pieces, and repeating the cycle of operations in continual sequence.

Another object is to provide a carrier for a hydraulically operated rivet set adapted for successive positioning on a stationary curved support for successive riveting operations in conjunction with dollies mounted on a curved support which is movable toward and away from the stationary support to provide clearance for the work assembly as it is being shifted following the completion of a row of rivets.

Still another object is to provide such a carrier adapted to be rolled into successive positions for locking engagement on a stationary curved support thereby to maintain the rivet set in operative position opposite successive dollies during riveting operations.

Other objects of the invention, additional features of novelty, and structural details of the machine will be more apparent from the following description when read in conjunction with the accompanying drawings, wherein:

Fig. 1 is a front view in elevation showing the machine completely assembled and in operative position with a work unit arranged for riveting;

Fig. 2 is an end view of the machine in elevation with a conveyor in position to advance a work unit for riveting;

Fig. 3 is an enlarged front view, in perspective and partly in section, of a fragmentary portion of the upper carriage assembly with the dollies lowered into operative position upon a work unit assembly (shown partly in section) and of a portion of the lower carriage assembly with the rivet set and carrier arranged opposite a dolly ready for a rivet upsetting or squeezing operation;

Fig. 4 is a further enlarged front view, chiefly in elevation and partly in section, showing the rivet set carrier held in operative position by the engagement of one pair of rollers with the detent recesses upon the carriage tracks and with the rivet set and dolly at the completion of a rivet squeezing operation;

Fig. 5 is a view, chiefly in longitudinal section as indicated by the arrows 5 in Fig. 4, showing the details of the mounting of a dolly and the arrangement of the rivet set in relation to the carrier and the hydraulic actuating unit;

Fig. 6 is a front view, in elevation, of a portion of the machine with the upper and lower carriage assemblies in operative position, with a work unit assembly disposed upon the conveyor in position for riveting, and with the cam operating device in lowered position, there being included in the view a transverse section of the conveyor and an elevation of a work advancing roller thereon;

Fig. 7 is a cross-sectional view through the cam shaft as indicated by the arrows 7 in Fig. 6 showing the cam, and the follower or yoke slide, in lowered position;

Fig. 8 is a front view, as in Fig. 6, but with the section through the conveyor taken on a different plane, the upper carriage assembly elevated to inoperative position, the cam bearing block removed and with the gib, channel member, and carriage plate fragmented to show the cam shaft disposed through the yoke slide;

Fig. 9 is a cross-section through the cam shaft as indicated by the arrows 9 in Fig. 8 showing the cam and yoke slide in raised position;

Fig. 10 is a front view, partly in elevation and partly in section, of the cam operating device showing the cam in lowered position;

Fig. 11 is a top view, partly in section, of the cam elevating device, showing the mounting of the cam upon the cam shaft and the arrangement of the latter in the bearing block and the elements of the supporting frame;

Fig. 12 is an end view of the cam shaft bearing block with the lowered position of the cam and cam slot shown in dotted lines and the raised position thereof in dot-dash lines;

Fig. 13 is an end view of a yoke slide and side connecting plate with fragmentary portions of the vertically arranged central plate and reinforcing angle irons in riveted assembly with the side connecting plate and central plate;

Fig. 14 is a section view taken along the line 14—14 in Fig. 13 showing particularly the side connecting plate supporting the yoke slide and secured to the central plate and reinforcing angle irons;

Figs. 15, 16 and 17 are sectional views taken respectively along the lines 15—15, 16—16, and 17—17 in Fig. 14;

Fig. 18 is an end view of the yoke slide guide assembly including the channel members, gibs, carriage plates and a fragment of the cam bearing block;

Fig. 19 is a front view of the channel member;

Figs. 20 and 21 are respectively top and front views of the gib;

Fig. 22 is a section view of the guide assembly taken along the line 22—22 of Fig. 18;

Fig. 23 is a bottom view of the carrier;

Figs. 24, 25 and 26 are section views of the carrier taken along the irregular lines 24—24, 25—25, and 26—26 respectively of Fig. 23;

Fig. 27 is a fragmentary view of a dolly alternately in operative and inoperative position and of the rivet set in operative position in reference to a fragment of the work assembly; and Figs. 28 and 29 are respectively a top and a section view of an element of the dolly mounting.

Figs. 1 and 2 are drawn on a relatively small scale; Figs. 6–9 and 13–21 to a larger scale; Figs. 10, 11 and 12 on a still larger scale; Fig. 3 on an even larger scale; and Figs. 4–5 and 22–27 are still further enlarged. Figs. 28 and 29 are the most enlarged.

The rivet set is shown extended, by hydraulic pressure, in Figs. 1, 3, 4, 5, 6 and 27; and retracted in Figs. 8, 24 and 25.

Referring now to Fig. 1, the frame of the riveting machine is fabricated from structural steel plates, channels, and angle irons, and comprises a lower carriage assembly, generally indicated as 20, which is stationary and an upper carriage assembly or yoke, generally indicated as 21, which is movable in a vertical plane toward and away from the lower assembly by a manually operated cam unit, generally indicated at 22. A shuttle or carrier 23, supporting a hydraulic riveting unit 24, is movable by the operator across the upper curved portion of the stationary carriage to position the movable die tool or rivet set 25 successively opposite a plurality of stationary die tools or dollies 26 each of which comprises individual anvil means fixedly mounted in the lower curved portion of the upper carriage assembly. "Stationary dies," as used in the specification, mean dies or tools which are stationary with reference to the upper carriage assembly, although such assembly is movable in relation to the lower stationary assembly. In the illustrative embodiment two carriers 23 including hydraulic riveting units 24 and 24' are shown, (Fig. 1), an arrangement which enables two operators to work at the machine at the same time. Work sheets A and B (Figs. 3 and 4), which may be of aluminum, steel, or other metal, each having along its lateral edge a row of preformed holes (not shown) for the reception of rivets, are overlapped to bring the holes into alignment. A reinforcing angle or carling C, similarly provided with rivet holes (not shown), is positioned so that its holes are brought into alignment with the holes in work sheets A and B, and the three pieces are temporarily assembled by means of bolts (not shown). Such assembling is preferably done on the roller conveyor mechanism, generally indicated at 27 (Fig. 2), and the assembly is then moved along the conveyor in a manner hereinafter more fully described to a position conveniently short of aligning the holes with the riveting mechanism. Rivets are inserted in the holes through the three pieces, the temporary holding bolts are removed, and the assembly is advanced to bring the rivets into alignment with the rivet set 25 and dollies 26. The operation of riveting the assembly by upsetting the rivets is effected by a series of single movements, or "squeezes," of the movable die or rivet set 25 by hydraulic power against the stationary dies or dollies 26. Upon completion of the riveting together of one pair of overlapped sheets and the reinforcing angle, it is desirable to advance the work endwise to bring into riveting position the rear edge of the second work sheet B. Said second work sheet B is also formed with a row of preformed rivet holes and is now overlapped by the forward edge of a third sheet (not shown) and temporarily fastened together with another reinforcing angle (not shown) both of the latter rivet holes corresponding to those in sheet B. A downwardly directed flange D of the first reinforcing angle or carling C does not prevent such an advance, as might seem from Fig. 8, because at the time the work is shifted the rivet set is in the retracted position. Also, the upper carriage assembly is held in elevated position by the manually operated cam unit 22 to allow the sheets and rivet heads to clear the dollies 26. The work assembly is then advanced on the roller conveyor as previously referred to but hereinafter more fully described, the upper carriage assembly is lowered by the cam unit 22, and the carrier or carriers 23 are positioned, as desired, for another cycle of operations.

The lower stationary carriage assembly 20 comprises a pair of carriage plates 28 (Figs. 3 and 5) having an upper edge 29 longitudinally curved, as desired, to conform to the shape of the sheets to be riveted, which, in the present instance, are railway car roofs in the shape of a segment of a cylinder. These plates are arranged in parallel relation to each other in vertical planes and are rigidly secured by rivets 31 (Figs. 6, 10, 13 and 22) to the flanges 32 of the outwardly presented channel members 33 which extend vertically to serve as supports for the carriage plates 28. Suitable base angle irons 34 (Fig. 2), extending horizontally and transverse to the carriage plates, are riveted to the lower end of the vertical channel members 33 and the assembly is reinforced by gusset plates 35 disposed between the channel members and angle irons to provide a broad and stable base for the machine. Tie bolts 36 extend through the parallel plates 28, and through conventional spacer sleeves 36a (Fig. 18) to prevent outward buckling of the plates 23 under operational pressure. The conventional spacer sleeves surround the bolts to prevent inward buckling of the plates 28. Rigidly secured by rivets 37 (Fig. 5) to the longitudinally curved upper edge 29 of each plate 28 is a reinforcing angle iron 38 which is shaped to conform to the curve of the plate; and secured to each angle iron 38 by screws 39 is a strip 41, likewise conforming to the curve of the sheet. Strips 41 are in parallel relation and form the rails upon which the carrier 23 is mounted to travel across the machine to position the rivet set successively opposite the dollies.

Referring to Figs. 1 and 6, the upper carriage assembly 21 comprises a central vertical plate 42 reinforced by a pair of horizontally arranged angle irons 43 secured across its upper end by rivets 44, by a pair of vertically arranged angle irons 45 secured to each of its vertical sides by rivets 46, and by a pair of curved angle irons 47 secured along its curved lower end by rivets 48. Connecting plates 49 (Fig. 14) are disposed on the lower outer portion of the assembly, one on each side, and are arranged between the lower portions of each pair of vertical angle irons 45 to which they are secured by rivets 51 and extend between the gusset plates 52 and the curved angle irons 47 to which they are secured by rivets 53 and 54 respectively. Rigidly secured by rivets 55 (Figs. 6 and 13) to the lower portion of the connecting plates 49 are yoke slides 56 each of which is formed with a vertically extending slot 57 (Fig. 13) in its upper portion for the reception of the connecting plate 49. Since gusset plates 52 and angle irons 47 are secured to the central vertical plate 42 by rivets 53 and 54, respectively, it is apparent that connecting plates 49 maintain yoke slides 56 in rigid relation to the central vertical plate 42. Yoke slide 56 is, therefore, integrally connected to the upper carriage assembly; and, as will be later explained, is slidable vertically within the channel member 33 which is integrally connected to the lower stationary carriage assembly. Each yoke slide 56 is also provided with an oblong cam slot 58 (Figs. 7, 9 and 13) in its lower portion for the reception of cam 59 for purposes hereinafter to appear.

At each outer end of the lower carriage assembly is arranged a U-shaped cam bearing block 62 (Figs. 6, 10, 11 and 12) comprising a pair of side plates 63 welded at 64 (Fig. 11) to an end plate 65 which has inclined end portions 66. Each bearing block 62 is rigidly secured to the lower carriage plates 28 by cap screws 67 (Figs. 10 and 11) and by dowel pins 68 and to the carriage plates 28 and channel member flanges 32 by cap screws 69. Through the end plate 65 is formed a bore 70, which is in axial alignment with a bore 71 in a supporting boss 72 on the channel member 33, and in partial registry with the ellipsoidal cam slot 58. A cam shaft 73 is rotatably mounted in the cam bearing blocks 62 through the bores 70 and 71 and the slot 58 and extends transversely of the machine between the spaced lower carriage plates 28. Suitable bushings 74 and 75 for the cam shaft are provided in each channel boss 72 and cam block end plate 65 respectively. Cams 59 are mounted upon the cam shaft 73 between the channel members 33 and the block end plates 65, by means of a keyway 76 in the shaft and an insertable key 77.

Handle 78 (Figs. 2 and 10) is mounted upon the cam shaft 73 and is prevented from rotation in reference to the shaft by a key 79 (Fig. 10) inserted in mating keyways 81 and 82 in the handle and shaft respectively. Retainer nut 83 maintains the handle in operative position on the shaft. Stops 84, threaded into the block end plate, limit the swing of the handle to an arc of 180°. Referring to Figs. 11 and 12, it can be seen that the cam shaft 73 is arranged off the center line L of the cam bearing block and to the left thereof. Cam slot 58, however, as shown in Fig. 12, is arranged so that it is divided symmetrically by said center line. The radius of the end portions of the cam slot 58, is slightly larger than the radius of the cam, so that when the cam is in down position, as indicated at P in Fig. 12, a slight clearance is provided between the cam and the slot. In such down position, the cam slot periphery is indicated at S (Fig. 12) and the cam handle 78 extends to the right to rest on one of the stops 84. Upon rotation of the handle in a counterclockwise direction through an arc of 180°, as viewed in Fig. 12, the cam will also rotate counterclockwise around the center of the cam shaft and will move from the position P to the P' position. The yoke slide 56, in which the cam slot is formed, will be elevated to the extent indicated by the change of the cam from position P to P' or the distance F which, in the illustrative embodiment, is in the order of one inch. Upon reaching the P' position, the cam will fit into the arcuate end portion at the left of the slot 58, as viewed in Fig. 12, and the upper carriage will be maintained in locked position. Upon turning the handle 78 clockwise the cam will be rocked from the position indicated by the dot-dash lines P' to the dotted line position P of Fig. 12, thus lowering the yoke slide 56 to its operative position. Since the cam arrangement is the same on both ends of the shaft, both yoke slides will be elevated to exactly the same extent carrying with them the entire upper carriage assembly including the row of dollies. For the easier and accurately directed sliding of the yoke slides 56 within the channel members 33, a pair of precision machined gibs 85 (Figs. 11, 12, 20, 21 and 22) is disposed between the flanges 32 of the channel members 33 and the side faces of the yoke slides 56. Such an arrangement maintains the dollies 26 in accurate axial alignment with the rivet set 25 as it is moved along the curved tracks 41. Recesses 86 are formed in the outer faces of the gibs 85 to provide clearance for the headed inner ends of rivets 31 and for the shank ends of cap screws 69 respectively (Figs. 18, 20, 21, 22). The gibs 85 are also provided with threaded holes 87 for the reception of screws 88 to maintain the gibs 85 in fixed position. In fabricating the yoke slide 56, it has been found that the operation of milling the vertically-extending slot 57 springs the piece laterally so that it is difficult to assemble with the gibs 85 and channel member 33 (Fig. 13). Accordingly, sufficient inward resiliency is given to the bifurcated upper portion of the yoke slide 56 by an aperture 89 (Fig. 13) bored through the body of the slide 56 contiguous to the lower end of the vertically extending slot 57 to permit of easier assembly.

Turning now to the shuttle or carrier 23 for the hydraulic riveting unit 24, and as best seen in Figs. 3, 4 and 23, center block 90 is generally square with arcuate recesses 91 in its sides. Outer walls 92 of the block are in the same vertical planes as outer walls 93 of the rails 41. A downward projection 94 of the block 90 has side walls 95 (Fig. 24) which are accurately machined to fit flush with downwardly directed flanges 96 of the angle irons 38 which serve as guides to maintain the block exactly in its transverse course as it is moved along the rails 41.

A pair of vertical bores 97 for the mounting of rollers 98 is formed to extend entirely through the block, said bores being spaced wide and lying in the same vertical plane transverse to the plates 28 (Figs. 4 and 24). These rollers are adapted to travel on smooth curved surfaces 99 adjacent the outer edge of rails 41 which serve as a track for the movement of the block. Another pair of vertical bores 100 is formed in the opposite end of the block and likewise extends entirely therethrough (Figs. 23 and 25). These bores are spaced more closely to each other than the bores 97 and provide the means for the mounting of another or inner pair of rollers 101 which is adapted to travel on, and near the inner edge of, each rail 41. Slots 102 are formed in block 90 adjacent bores 97 and 100 and have a width substantially equal to the width of rollers 98 and 101. These slots serve to prevent the rollers from castering or swiveling as the carrier is moved along the rails. The dropped surface path of the inner pair of rollers 101 is provided with a series of equally spaced arcuate detent recesses 103 (Fig. 26) which are milled in the curved surfaces along the inner edge of the rails and which are adapted to receive the rollers 101. These detent recesses are provided so that the carrier may be rolled by the operator from position to position progressively, as determined by the location of the recesses, to station the hydraulic riveting unit 24 and rivet set 25 opposite each dolly 26. As the rollers fall into the detent recesses, the carrier is automatically positioned to align the rivet set 25 opposite a dolly 26, thus accurately lining up the set and dolly before each squeezing operation.

Block 90 is telescopically spring mounted upon the two pairs of rollers 98 and 101 so that in normal position it is elevated slightly from the surface of the rails, as indicated by the space 104 (Figs. 24, 25, 26). Compression springs 105 are associated with the inner pair of rollers 101 which cooperate with the detent recesses 103 to form a yieldable lock to hold the block in operative position, as previously pointed out. Compression springs 106 cooperate with the outer pair of rollers 98 to permit the carrier to be shifted from position to position without riding up and down with the inner rollers on the washboard-like track. A guide member 107 is mounted upon each of the rollers by a pin 108 extending through the roller and journalled in corresponding cylindrical apertures 109 in a downwardly extending bifurcated portion 111 of the guide member. Each guide member 107 has a cylindrical body portion 112 which slidingly fits the bore in which it is mounted and has an upwardly extending portion or extension 113 of reduced diameter so that an annular shoulder 114 is formed thereon. This reduced diameter portion 113 of the guide members 107 receives the spring 105 or 106. Each member 107 is provided at its upper end with a limited bore 115 threaded for the reception of cap screw 116, for a purpose hereinafter set forth. The upper portion of the bores 97 and 100 in the center block are likewise threaded for the reception of special nut members 117 each of which has a bore 118 in its cap portion 119 of the same diameter as the outside diameter of the guide member upwardly extending portion 113 to permit the positioning of the cap 119 over the portion 113 and into contact with the upper surface of the block 90. Each such nut member 117 has a counterbore 121 of somewhat larger diameter than the outside diameter of the guide extension 113 thereby forming an annular space disposed over the shoulder 114 of the guide for the reception of the compression spring 105 or 106. These springs are of sufficient strength normally to maintain the block 90 in an elevated position in reference to the rails 41. When pressure is applied during the riveting operation, however, the springs will yield, allowing the block to rest solidly upon the smooth surface 99 of the rails as shown at 123 (Fig. 4). This engagement, at each of the four corners of the block, provides a frictional lock preventing the carrier 23 from being shifted along the rails 41 during the rivet upsetting operation.

Each of the cap screws 116 is surrounded by a retainer washer 124 and serves to secure the washer to the top of the upwardly extending portion 113 on the guide member 107. The purpose of the retainer washers is to limit the distance that the carrier block 90 can rise above the level of the rails 41 under the force of the pre-compressed springs 105 and 106. The guide members 107 for the outer pair of rollers 98 are in practice manufactured in the same size as those for the inner pair 101 and, in order to compensate for the shorter stroke of the former (relative to block 90), the caps screws 116 thereon are surrounded by a spacer washer 125 underlying the retainer washer 124.

Vertically mounted in large bore 126, which is centrally formed in the block 90, is the hydraulically operated riveting unit 24. Riveting unit 24 (Figs. 4 and 5) comprises a set holder 127 having an upward extension 128 of reduced diameter which forms a shoulder 129, movable set or die 25 frictionally secured in the upper portion thereof, a sleeve or pressure pad 130 surrounding and slidably fitting the set 25 and a compression spring 131 for the pressure pad, said spring resting on the shoulder 129. The pressure pad 130 and the supporting compression spring 131 clamp the work pieces tightly together against the dollies 26 before the rivet set 25 makes contact to upset the rivet. The top face of the pad is serrated or knurled to form a rough surface to prevent the work sheets from slipping after they have been arranged for riveting. The serrated portion of the upper end of the sleeve or pad 130 is cut out, as shown at 130' in Figs. 4 and 6, to make the rivet set 25 visible. In order that the pressure pad 130 may tightly engage the work sheet C shortly prior to, during, and shortly subsequent to, the time that the rivet set 25 is in contact with the rivet R, the pressure pad is arranged to move a limited distance relative to the rivet set, first downwardly under the reaction of the work and later upwardly in response to the pressure of spring 131. Stated differently, the rivet set 25 is arranged to move upward in unison with the pressure pad 130, then upward relative to the pad, then downward relative to the pad, then downward in unison with the latter. To provide for such relative longitudinal movement while preventing rotary movement, the pressure pad 130 has a vertical slot 132 (Fig. 25) which receives a pin or stud 133 mounted in the set holder extension 128. With the parts in normal position as shown in Fig. 25, the pin 133 engages the lower end of the slot 132 and maintains the spring 131 in a precompressed condition.

The hydraulic riveting unit which operates the riveting unit 24 comprises further a flanged work cylinder 134 (Figs. 5, 24 and 25) secured by screws 135 to the underside of the block 90 and having a detachable head sleeve 136 extending upwardly through the central bore 126 in the block. Annular flange 137 extends radially from the cylinder head into a corresponding recess 138 in the lower portion of the block 90 and rests upon the upper face of the cylinder thereby retaining the cylinder head 136 in stationary position on the work cylinder 134. Set holder 127 has a downwardly extending portion 141 of reduced diameter which is provided with an annular groove 142, said extension fitting into a cylindrical recess 143 in the upper portion of a piston 144. The cylindrical surface of the recess 143 is formed with a groove 145 opposite the groove 142 in the extension to form a pair of raceways for locking balls 147. Supply aperture 148 is for assembly purposes and is arranged to enter the annular slot 146 so that the locking ball members may be inserted into the slot therethrough. Plug 149 closes aperture 148.

Work cylinder 134 is connected to a power plant or source of oil pressure (not shown) by high pressure hose 151 (Fig. 4) leading into port 152 which is in communication with the lower pressure chamber 153; and by a low pressure or return hose 154 leading into port 155 which communicates with the longitudinal passage 156 whence it connects through port 157 into the upper pressure chamber 158. Operator supplies high pressure oil to the lower chamber 153 to advance the piston 144 and hence the rivet set 25 upwardly for the upsetting operation. Oil is then supplied to the upper chamber 158 to return the piston to initial position.

Referring now to the work conveying mechanism, generally indicated as 27 in Fig. 2, and which is adjacent the main riveting machine and upon which the component sheets A and B and carlings C are temporarily assembled and advanced to be riveted, conveyor rollers 159 (Fig. 6) are rotatably mounted on pins 160 rigidly secured to the vertical flange of the parallel angle iron supports 162 which extend horizontally above and transverse to the plane of plates 28. The rollers 159 are spaced (Fig. 2) at intervals every eighteen or twenty inches throughout the conveyor track, as desired, to provide means for carrying the weight of the assembled work pieces and for advancing them into riveting position. Near each of the horizontal rollers 159 is a vertical roller 163 (Fig. 8) mounted to turn about a pin 164 and resting on a spacer sleeve 165. The lower end of the pin is supported on the angle iron 162 while the upper end is attached to a horizontal flange 166 that is secured to the angle iron. The vertical rollers 163 engage the depending flanges E at the sides of the metal sheets A and B to keep the assembly of work pieces in alignment and also prevent such assembly from straightening out due to its own weight. Angle iron supports 162 are in turn supported by the stanchions 167 (Fig. 2) to which they are secured by conventional means, said stanchions having angle iron supports 168 to form a base rigid and sturdy enough to support not only the conveyor apparatus but also the heavy work pieces to be assembled and riveted.

The conveyor 27 is about 60 feet long and is supported on the floor at several points throughout its length. Although it extends forwardly and rearwardly from the riveting machine 20—21 it is not actually attached thereto but is accurately positioned relative to the machine to cause the rivets R to line up with the dollies 26 when the latter are lowered to operative position.

As previously described, the operator or operators advance the work piece assembly into alignment with the dollies 26 and the carrier 23 is moved manually by handle 78 to bring the rivet set 25 into operative position in a predetermined order opposite the desired dolly or the individual anvil means. Upon completion of the riveting operation and the elevation of the upper carriage assembly, as previously described, the assembly is advanced along the section 169 of the conveyor on the front side of the main riveting machine, said conveyor section supporting the finished part of the roof, as shown in Fig. 2. The construction of that section of the conveyor is the same as the forward or feeding section 171, although the two sections are separate units. The conveyor apparatus is not per se the invention of the applicant, and is shown here merely as illustrative of any form of suitable conveyor.

The means for supporting the row of dollies upon the central vertical plate 42 will now be described. Strip plate 172 (Figs. 3 and 5), which extends along the bottom edge 173 of the central plate 42 for the greater part thereof (Fig. 6) and is curved to conform to the curvature of such plate, is rigidly secured to the angle irons 47 by rivets 174, and is thus brought up flush against the bottom edge 173 of plate 42. A longitudinal groove 175 is formed centrally in the bottom face of the plate and extends throughout the entire length thereof for the reception of the special dolly retaining nuts 176 (Figs. 5, 28, 29), as will shortly appear. Arranged against the bottom face 177 of strip plate 172 (Fig. 5) is the dolly supporting channel strip 178 which is longitudinally arcuate to conform to the curvature of the plate 172 and which extends the greater part of the length of the latter and is secured thereto by screws (not shown). Spaced as desired in said dolly supporting strip member is a series of apertures 179 each having a channel opening 181 in which is arranged the dolly retaining special nut members 176. Such member 176 (Figs. 28 and 29) comprises a body 182 having a central threaded aperture 183 and a locating flange 184 adapted to fit loosely into groove 175 to prevent rotation of said member 176. In assembling the strip member 178 (Fig. 5) to the plate 172, the special nut members 176 are first arranged with the body 182 in the channel opening 181, and the flanges 184 are then brought up into the groove 175 as the strip is secured to the plate. The nut member 176 is thus in position to receive a threaded upper projection 185 of a dolly holder 186. To facilitate turning of the dolly holder, it is provided with a series of radial bores 187. Dolly 26 is removably secured to the supporting dolly holder 186 by conventional means.

It should here be observed, and as shown by the center line CL in Fig. 5, that the center lines of the piston 144, the set holder 127, the set 25, the dolly 26, the dolly holder 186, and the central plate 42 are in axial alignment with each other in the same vertical plane as plate 42. Thus, as the rivet set 25 is forced upward by the hydraulic pressure applied to the piston 144, it will be directly opposed by the dolly 26 which is maintained in an immovable position by the upper central carriage plate 42 as locked by the connecting plate 49 and yoke slide 56 in cooperation with the cam 59 in cam slot 58. The reaction to the riveting force is absorbed by the lower carriage assembly after the carrier block 90, which is bolted to cylinder 134, makes contact with rails 41 along the four surfaces 123 (Fig. 4). The curvature of the rails 41 is of uniform radius and concentric with the curvature of the bottom edge 173 of plate 42 when the latter is in a lowered or operative position, and accordingly with the curvature of the plate 42 and the dolly holding strip plate 172. Therefore, as the carrier 23 is successively advanced from operative position to operative position, it will bring the rivet set 25 successively opposite the stationary dollies 26 and into axial alignment therewith. The rivets R are usually, though not necessarily, spaced apart uniformly, and the dollies 26 and milled recesses 103 are spaced at corresponding distances. The operator need only shift the carrier 23 the approximate distance on each step, and the carrier will align itself automatically as the rollers 101 drop into recesses 103.

In operation, steel sheets A and B (Figs. 2, 3 and 6) and the reinforcing angle iron, or carling C, are first formed off the job to the curvature required for a car roof namely, with a uniform radius from one side of the roof to the other; and a row of rivet holes is punched or drilled in each edge of the sheets and in the angle iron. The three pieces are then temporarily assembled right side up on the conveyor, preferably with three or four bolts in a row of holes, so that the edge of the first sheet A is overlapped by the edge of the second sheet B; and by the carling C whose preformed holes register with the holes in the sheets. The assembled pieces are then advanced by the operator along the rollers 159 of the conveyor, with the depending flanges E of the sheets resting on the rollers. When the assembly is conveniently short of alignment with the row of dollies 26, the temporary securing bolts are removed and rivets are inserted from the top side into each of the registering holes in the overlapping sheets and depending carling with the head resting upon the upper curved surface of sheet B. There may be, for example, sixty rivets in a row for each car roof joint. The assembly of parts A, B, C and rivets R is again moved forward by the operator or operators into alignment with the dollies 26. The operator turns the cam lever or handle 78 to lower the dollies into engagement with the rivets R, observing at the same time that they are in proper alignment, or otherwise readjusting the work pieces on the conveyor. When the cam lever reaches the limit position shown in Fig. 2 (solid lines) and Fig. 7, the sixty rivets R are bucked simultaneously, and the cam lever and dollies are locked in their lower positions by the cam 59. Each of the carriers 23 is then positioned, or re-positioned, along the track 41 so that its associated rivet set 25 is accurately aligned with one of the dollies.

The actual riveting is done hydraulically under the control of an operator; or preferably two operators who stand on opposite sides of the work sheet assembly and each of whom moves one of the carriers and operates suitable control means to head half of the row of rivets. For this purpose, each carrier 23 or 23' is provided with a handle 188 (Figs. 3 and 5) supported by a clamp 189 secured by one or more bolts 191 to the carrier block 90. The handle encloses an electric switch (not shown) connected by a cable 192 to a standard two-way hydraulic power plant (not shown). Each operator, independently of the other, may initiate a riveting cycle by pressing the switch button (not shown) lying below cap 193 (Fig. 3) on handle 188, which sets into operation a remote pumping apparatus for supplying high pressure oil through the hose 151 (Fig. 4) to the lower end of the riveting cylinder 134. The piston 144 of course rises, carrying with it the rivet set 25 and pressure pad 130. The latter moves into position surrounding the shank end of the rivet R. The work pieces, comprising two roof sections A and B and carling C, are thus pressed very tightly together between the pressure pad 130 and the associated dolly or dollies 26, before the rivet set makes contact with the rivet R. Continued upward movement of the piston causes the rivet set 25 to engage and then upset the lower end of the rivet R under a very great squeezing pressure. After the rivet has been headed to a predetermined pressure, the power plant automatically reverses its cycle (in response to the back pressure of oil in hose 151), and pumps low pressure oil through the return hose 154 while exhausting the high pressure hose 151. The rivet set 25 and pressure pad 130 are quickly returned to the inoperative position shown in Figs. 8, 24 and 25. This relieves the pressure of the pad 130 against the work and also the braking pressure of the carrier block 90 over the areas 123 (Fig. 4) which lie on the smooth surface of the track 41. Still grasping the handle 188, the operator shifts the carrier 23 along the track 41 until the rollers 101 drop into the next pair of detent recesses 103 thereby lining up the rivet set with the succeeding rivet and dolly. The operator, having by this time released the switch button to open the circuit, presses the button a second time to initiate a second cycle of riveting operation.

Upon the completion of the riveting of an entire row, extending along the joint between pieces A, B and C, the lever 78 is swung to the Fig. 9 position, thereby turning the cam 59 and elevating the dollies to the position shown in Fig. 8. The upper ends of the rivets being free, and the pressure pad being out of the path of the carling C, the sheets are advanced along the conveyor rollers 159 and 163 and the trailing end of the sheet B is assembled with a succeeding carling and sheet in the same manner as described with reference to the leading end of the sheet B to repeat the operation. Other sheets and carlings are added until the fabrication of the entire roof is substantially complete and the roof is then assembled by connecting depending flanges E with the sides of the car.

Due to the speed and accuracy of aligning the rivet set with the rivet and dolly, the machine of the present invention is especially useful for mass production work and has been found in practice to be capable of upsetting a row of sixty cold steel rivets in less than a half minute. While the invention has its greatest utility in the riveting of work pieces that are curved at a uniform radius throughout the length being riveted, it is not so limited but may be used with work of different contour, for example, flat. Nor need the riveter be limited to the hydraulic press type, as the rivet set might be actuated by other means, for example, a pneumatic hammer piston. Moreover the machine of the present invention is not restricted to riveting but can be re-tooled for dimpling, drilling, punching and various other operation.

What is claimed is:

1. In a machine for setting the connecting elements in work pieces in which the connecting elements extend transversely of the work pieces in a predetermined order, two frames cooperating with one another means for the vertical adjustment of one frame relative to the other, a plurality of stationary individual anvil means mounted upon the one frame in accordance with said predetermined order to engage simultaneously the connecting elements, a conveyor for supporting the work pieces and for feeding the same between said frames, manipulable means connected with the one frame for effecting the vertical adjustment of the one frame relative to the other frame and between working and non-working positions to engage the individual anvil means for each connecting element, thereby forcing the work pieces against said conveyor, a track extending across the other frame in said predetermined order, a power tool operable along said track to be aligned successively with the respective individual anvil means on the one frame and actionable in cooperation therewith to fix the connecting elements to the work pieces in succession upon the one frame being adjusted to its working position, the one frame when adjusted to the non-working position permitting the work pieces to be shifted between the frames.

2. A retaining arrangement for holding a plurality of die tools in spaced relationship with respect to each other comprising a supporting frame, a mounting strip carried upon the supporting frame and having a longitudinally-extending groove, a channel strip adapted to be connected to the mounting strip and having a series of apertures therein spaced from one another, a die tool holder for each aperture having a threaded projection extending through the aperture, a retaining member within the channel strip receiving the threaded projection of the holder and having a holding flange extending into the longitudinal groove in the mounting strip for engagement therewith to hold the same against rotational displacement upon the holder, and die tools respectively carried by the die tool holders.

3. In a machine for setting the connecting elements in work pieces in which the elements extend transversely of the work pieces in a predetermined order, as defined in claim 1, and said individual anvil means depending from the one frame and arranged to engage the connecting elements from above the work pieces along a circular arc to support the work pieces and the connecting elements against upward displacement, said one frame supporting the individual anvil means with their axes in a vertical plane in radial relation to the center of the circular arc, said track on the other frame being of arcuate shape, said one frame being adjustable to a working position adapted to have the arc of the individual anvil means substantially co-axial with the arc of the track, and the center of the arc of the individual anvil means coinciding with the center of the arc of the track.

4. In a machine for setting the connecting elements in work pieces in which the elements extend transversely of the work pieces in a predetermined order, as defined in claim 1, and said track having detent recesses corresponding respectively to the individual anvil means and detent means on said power tool engageable with the detent recesses in the predetermined order, as the power tool is adjusted over the track, whereby the power tool may be brought automatically into registry with the respective working tools.

5. In a machine for setting the connecting elements in work pieces in which the elements extend transversely of the work pieces in a predetermined order, as defined in claim 1, and said one frame having a mounting strip secured thereto with a longitudinally extending groove therein, and individual anvil means supporting channel strip secured to the mounting strip and having a series of apertures therealong, anvil means holders extending through the respective apertures and having respectively a threaded shank projection, an anvil means being contained in each of the holders, a retaining member for each holder having a threaded opening receiving the threaded projections of the holder and a holding flange adapted to fit into the longitudinal groove in the mounting strip to prevent the rotation of the retaining member.

GEORGE T. HARCOURT.

REFERENCES CITED

The following references are of record in the file of this patent:

UNITED STATES PATENTS

| Number | Name | Date |
|---|---|---|
| 192,448 | Morgan | June 26, 1877 |
| 484,473 | Steelow | Oct. 18, 1892 |
| 1,731,063 | Seabloom | Oct. 8, 1929 |
| 2,078,352 | Summers | Apr. 27, 1937 |
| 2,118,364 | Sheehan | May 24, 1938 |
| 2,209,407 | Lindsay | July 30, 1940 |
| 2,246,494 | Amiot | June 24, 1941 |
| 2,317,424 | Wales | Apr. 27, 1943 |
| 2,456,125 | Johndrew | Dec. 14, 1948 |
| 2,456,127 | Johndrew | Dec. 14, 1948 |

FOREIGN PATENTS

| Number | Country | Date |
|---|---|---|
| 616,024 | Germany | June 27, 1935 |